US006485252B1

(12) United States Patent
Heil (10) Patent No.: US 6,485,252 B1
(45) Date of Patent: *Nov. 26, 2002

(54) PALLETIZING SYSTEM AND METHOD FOR PALLETIZING A LOAD

(75) Inventor: Julius F. Heil, Sharpsburg, GA (US)

(73) Assignee: Burnham Service Company, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/322,410

(22) Filed: May 28, 1999

(51) Int. Cl.$^7$ ................................................. B65G 1/18
(52) U.S. Cl. .................. 414/799; 414/787; 414/225.01; 114/72; 403/384
(58) Field of Search .............................. 403/384, 349, 403/78, 319; 114/72; 414/787, 225.01, 799, 222.13; 108/56.3

(56) References Cited

U.S. PATENT DOCUMENTS

| 2,623,760 A | 12/1952 | Fornelius ..................... 280/179 |
| 3,478,995 A | 11/1969 | Lautzenhiser et al. ...... 248/361 |

(List continued on next page.)

FOREIGN PATENT DOCUMENTS

| DE | 81 10 297.6 | 11/1981 |
| DE | 204 894 | 12/1983 |
| DE | 82 27 248.4 | 3/1984 |
| DE | G 94 00 050.6 | 5/1994 |
| EP | 0 785 144 A1 | 7/1997 |
| FR | 2106986 | 9/1970 |
| FR | 2446239 | 1/1979 |
| GB | 1 361 066 | 7/1974 |
| GB | 2 210 517 A | 6/1989 |
| GB | 2 240 581 A | 8/1991 |
| GB | 2 247 899 A | 3/1992 |
| GB | 2 247 926 A | 3/1992 |
| GB | 2 248 283 A | 4/1992 |
| GB | 2 322 408 A | 8/1998 |
| GB | 2 322 435 A | 8/1998 |
| JP | 1-9157 A | 12/1989 |
| WO | WO 91/04137 | 4/1991 |
| WO | WO 95/30844 | 11/1995 |
| WO | WO 97/36123 | 10/1997 |
| WO | WO 98/05564 | 2/1998 |

OTHER PUBLICATIONS

Perstorp Xytec, Inc., AgBin Collapsible Containers for Agriculture: AgBin Collapsible Plastic Containers Improve Produce Quality, Reduce Operating Cost, 1995.

Litco International, Inc., Litco Product Information — Nestable Plastic Pallets, 1991.

*Primary Examiner*—Joseph A. Fischetti
(74) *Attorney, Agent, or Firm*—Sutherland Asbill & Brennan LLP (57) ABSTRACT

A palletizing system includes a reusable pallet and a reusable anchoring device for securing a load. The anchoring device comprises a strap and clamping mechanism for selectively receiving and clamping to the strap and, alternatively, releasing the strap. The pallet includes a base and one or more housings fixed to the base for receiving the clamping mechanism. Each housing has an opening for receiving the clamping mechanism and providing access to the clamping mechanism so that the clamping mechanism can be manipulated in the housing, and an aperture for receiving the strap, the aperture being sized to prevent the clamping mechanism from passing through the aperture. A method for palletizing a load includes placing a load on the upper face of a pallet, engaging the load and the pallet with a strap, and releasably clamping the strap with a selectively releasable clamping mechanism to secure the load to the pallet so that the load can be removed from the pallet by releasing the clamping mechanism from the strap.

22 Claims, 7 Drawing Sheets

U.S. PATENT DOCUMENTS

| | | | |
|---|---|---|---|
| 3,620,388 A | 11/1971 | Mansson | 214/10.5 R |
| 3,658,195 A | 4/1972 | Fantin | 214/10.5 R |
| 3,665,869 A | 5/1972 | Howe | 108/53 |
| 3,675,595 A | 7/1972 | Sullivan | 108/511 |
| 3,753,407 A | 8/1973 | Tilseth | 108/53 |
| 3,833,138 A | 9/1974 | Dean | 214/334 |
| 4,129,927 A | 12/1978 | Anderson | 24/136 A |
| 4,216,568 A | 8/1980 | Anderson | 24/136 A |
| 4,266,756 A | 5/1981 | Anderson | 256/47 |
| 4,804,087 A | 2/1989 | Smith | 206/335 |
| 4,829,909 A | 5/1989 | Mandel | 108/55.5 |
| 4,886,694 A | 12/1989 | Donnard | 428/137 |
| 4,911,084 A | 3/1990 | Sato et al. | 108/51.1 |
| 5,147,145 A | 9/1992 | Facey et al. | 403/314 |
| 5,170,721 A | 12/1992 | Troth et al. | 108/51.1 |
| 5,423,428 A | 6/1995 | Selz | 206/597 |
| 5,445,084 A * | 8/1995 | Durand | 108/56.3 |
| 5,483,709 A * | 1/1996 | Foster et al. | 5/81.1 |
| 5,505,140 A | 4/1996 | Wittmann | 108/51.1 |
| 5,515,977 A * | 5/1996 | Lambert | 206/597 |
| 5,651,463 A | 7/1997 | Major et al. | 206/599 |
| 5,772,369 A * | 6/1998 | Lerman et al. | 410/96 |
| 5,787,817 A | 8/1998 | Heil | 108/57.21 |
| 6,039,500 A * | 3/2000 | Kwon | 403/78 |

* cited by examiner

PALLETIZING SYSTEM AND METHOD FOR PALLETIZING A LOAD

TECHNICAL FIELD

This invention relates to pallets for storing a load and systems and methods for palletizing a load. More particularly, this invention relates to securing a load to pallets.

BACKGROUND OF THE INVENTION

Conventionally, a load is secured to a pallet for storage or transportation with flexible banding material which is wrapped around the pallet and the load or items on the pallet and then fastened to itself with a connector. To remove a load or items from the pallet, the banding material is cut and the used banding material is then useless and thrown away. This conventional banding technique is tedious, time consuming, and wasteful. Therefore, there is a need for a palletizing system and method for easily securing a load to a pallet without waste.

SUMMARY OF THE INVENTION

The present invention fulfills the above-described need by providing a pallet, a palletizing system, and a method of palletizing involving a reusable pallet and a reusable anchoring device. Generally described, the method of palletizing of this invention comprises placing a load on an upper face of a pallet, engaging the load and the pallet with a strap, and releasably clamping the strap with a selectively releasable clamping mechanism to secure the load to the pallet so that the load can be removed from the pallet by releasing the clamping mechanism from the strap. Multiple straps and releasable clamping mechanisms can be used.

More particularly, this invention encompasses a palletizing system for holding a load comprising a pallet including a base having an upper face for receiving the load and a lower face, and an anchoring device for holding the load on the pallet. The anchoring device comprises a strap for engaging the load and a clamping mechanism for selectively (1) receiving and clamping to the strap so that the load can be secured to the pallet with an anchoring device and, alternatively, (2) releasing the strap so that the load can be removed from the pallet. Desirably, the strap and the clamping mechanism are reusable.

According to one embodiment, the pallet further comprises an aperture for receiving the strap, the aperture being sized to prevent the clamping mechanism from passing through the aperture. More particularly, the pallet further comprises a housing fixed to the base for receiving the clamping mechanism, the housing including the aperture and having an opening for receiving the clamping mechanism and providing access to the clamping mechanism so that the clamping mechanism can be manipulated in the housing. To secure the load to the pallet, the strap is engaged with the load and fed through the aperture in the housing and then through the clamping mechanism. The clamping mechanism is fed along the strap until the strap is taut and the clamping mechanism is disposed snuggly in the housing of the pallet.

The clamping mechanism desirably comprises a body, at least one bore through the body for receiving the strap, and a gripping member movably disposed in the body for selectively gripping the strap in the bore to fix the clamping mechanism to the strap and, alternatively, releasing the strap so that the strap can be released from the bore. More particularly, the clamping mechanism body includes a channel in communication with the bore, the gripping member movably disposed in the channel. According to a particular embodiment, the channel in the body converges at an acute angle to the bore towards an inlet of the bore and the gripping member is movably biased towards the bore, such that, (1) when the gripping member is biased towards the bore, the gripping member forces the strap into frictional engagement with the strap within the bore and inhibits withdrawal of the strap through the inlet of the bore, and (2) when the gripping member is pulled away from the bore, the strap can be released through the inlet of the bore.

Other objects, features, and advantages of the present invention will become apparent from the following detailed description, drawings, and claims.

DETAILED DESCRIPTION OF DRAWINGS

As summarized above, this invention encompasses a palletizing system including a pallet and an anchoring system for anchoring a load to the pallet. The anchoring system and pallet are reusable and provide for easy loading and securing of a load on the pallet as well as releasing and unloading a load from the pallet.

Figure 1:
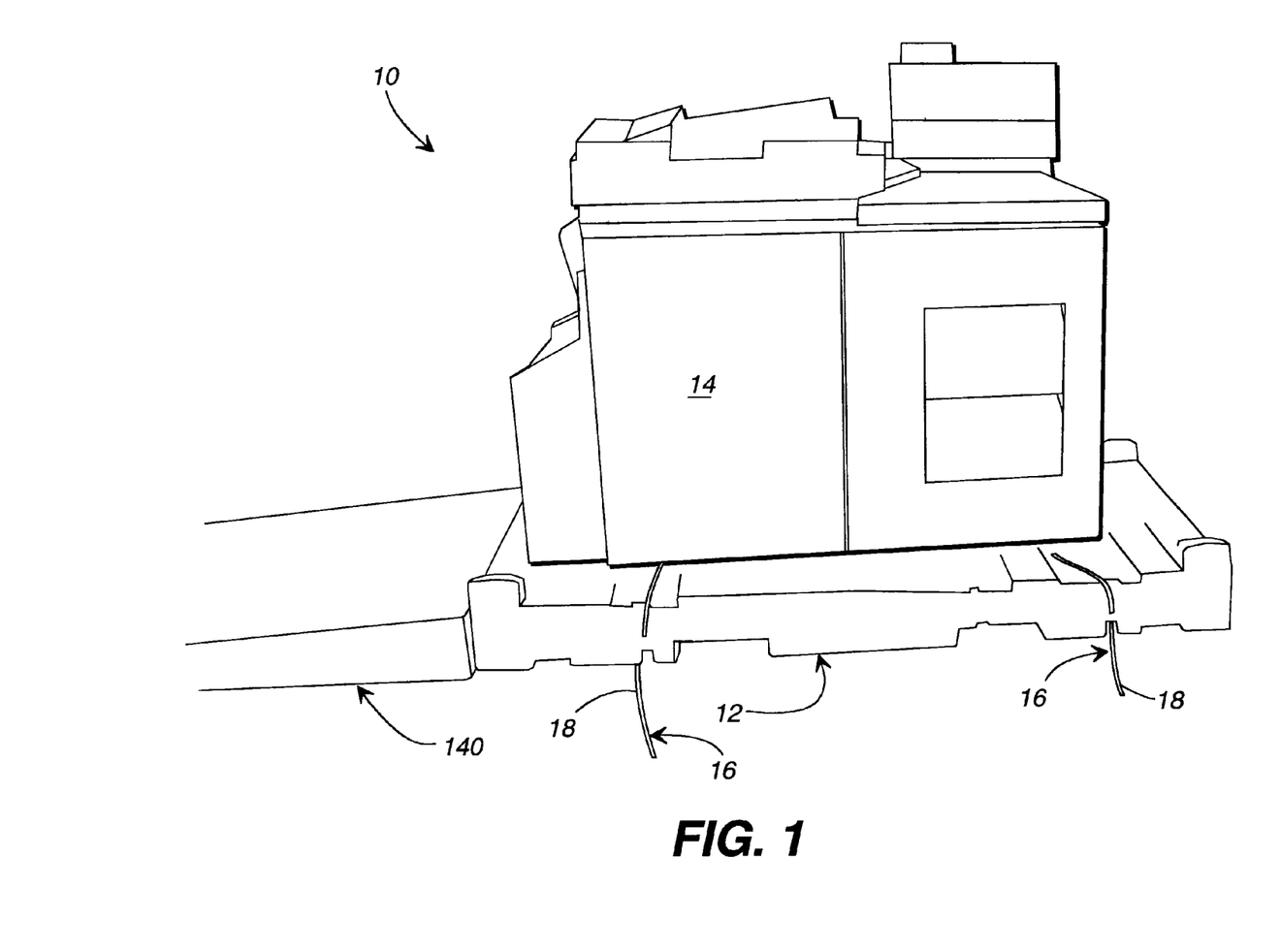
FIG. 1 is a perspective view of a loaded palletizing system in accordance with an embodiment of the invention.

In the drawings, like numerals reference like parts throughout the several views. FIG. 1 illustrates a palletizing system 10 made in accordance with an embodiment of this invention. This palletizing system 10 includes a pallet 12 for holding a load 14 and a plurality of anchoring system 16 engaged at different positions spaced about the pallet for securing the load to the pallet. Each anchoring system includes a strap 18 and a clamping mechanism 20 for releasably securing the load and the anchoring system to the pallet.

Figure 2:
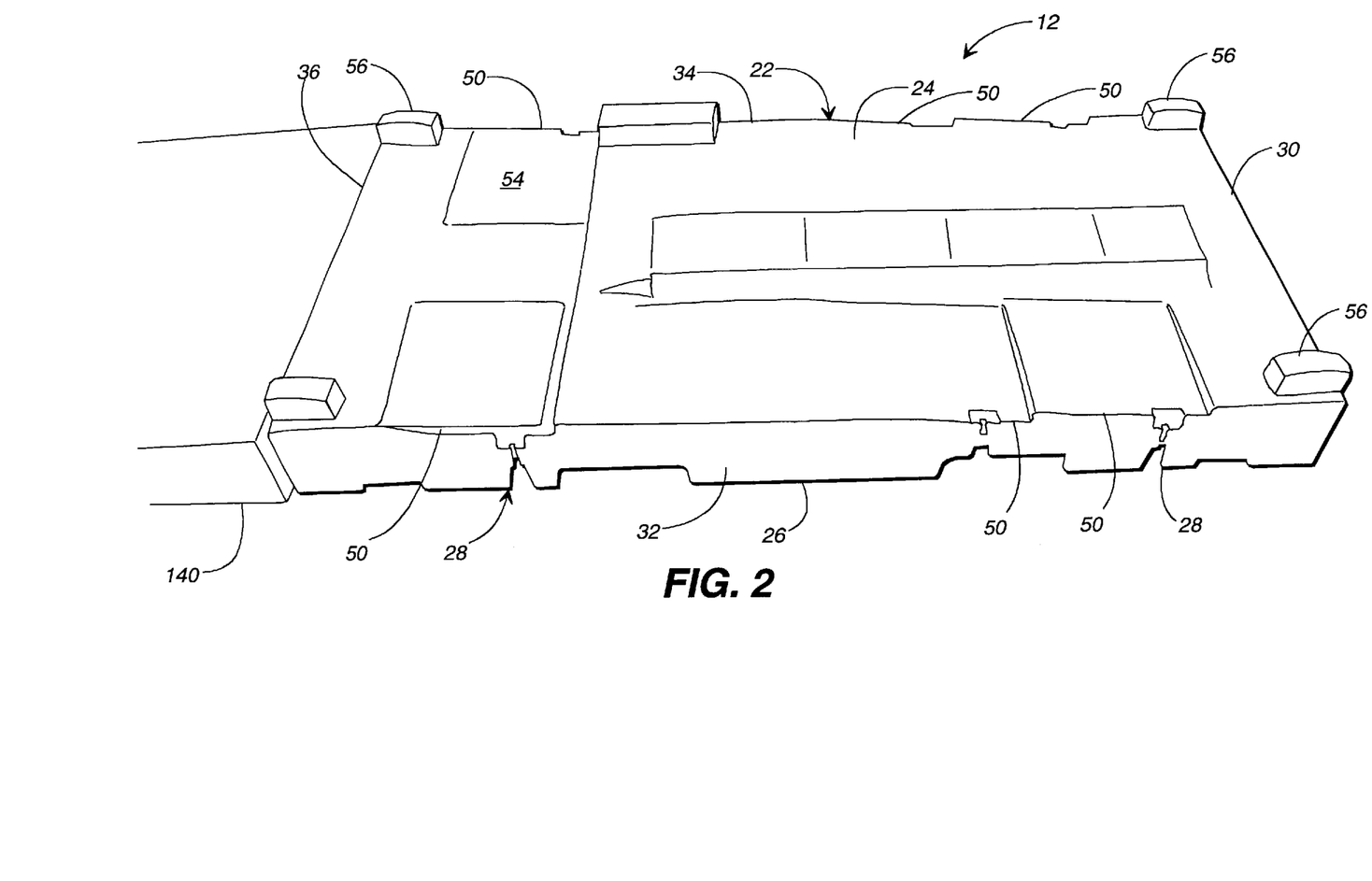
FIG. 2 is a perspective view of an unloaded pallet made in accordance with an embodiment of this invention.
Figure 3:
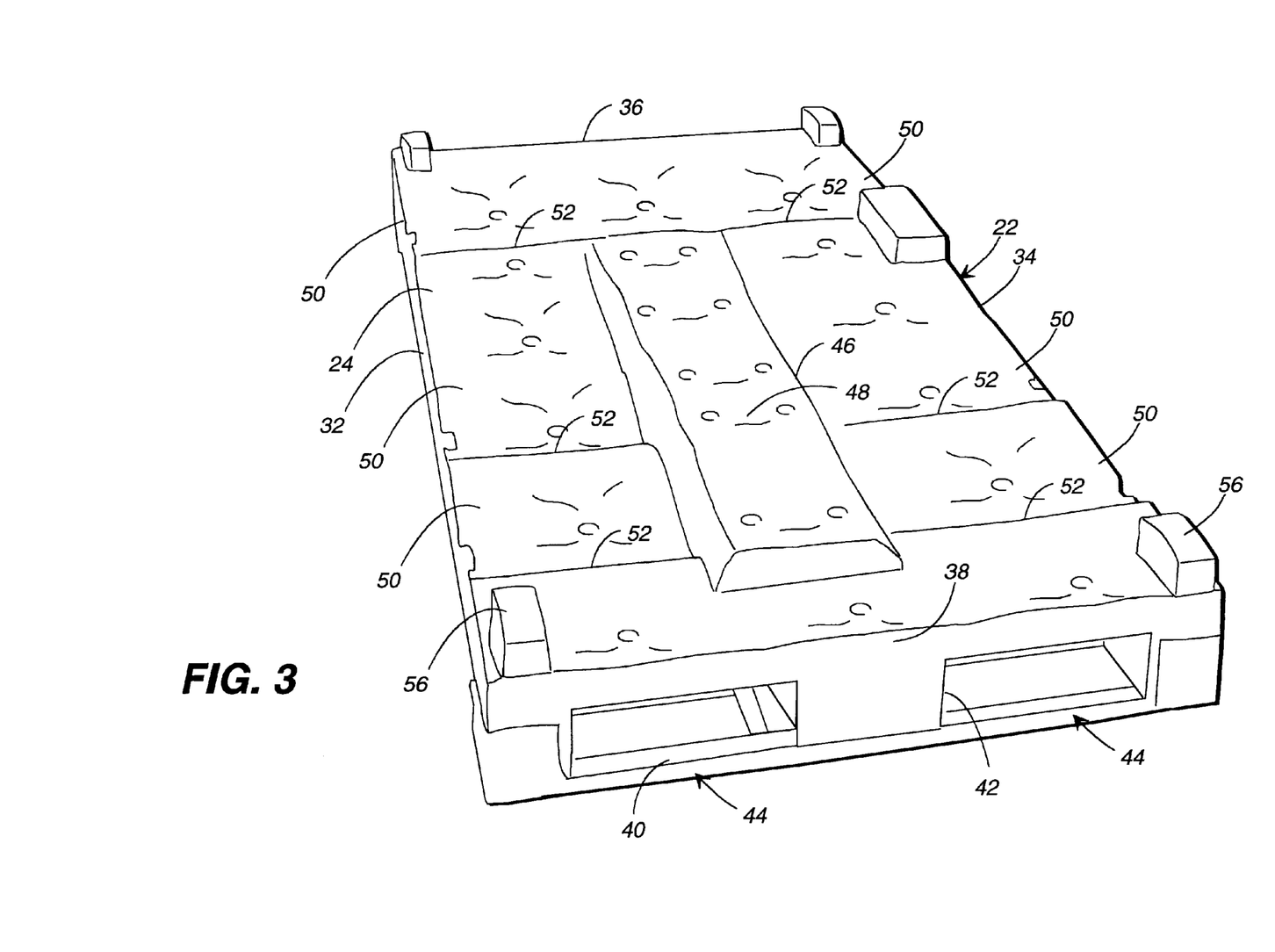
FIG. 3 is a perspective end view of the pallet illustrated in FIG. 2.

As shown in FIGS. 2 and 3, the pallet 12 comprises a substantially rectangular base 22 having an upper face 24 which supports the load on the pallet and a downwardly facing lower face 26. The pallet 22 also includes a plurality of housings 28 for receiving respective clamping mechanisms 20 of the anchoring device 16. The housings 28 are desirably spaced about the periphery of the pallet 12 with at least one housing proximate each corner of the pallet.

The pallet base 22 comprises a substantially rectangular platform 30 which includes the upper face 24 and sidewalls 32 and 34 which extend along edges of the platform from one end 36 of the base to another end of the base 38. Lower panels 40 extend laterally between the sidewalls 32 and 34 at each of the ends 36 and 38 of the base 22 and a central support 42 extends along the length of the base. The lower panels 40, central support 42, and platform 30 form forklift channels 44 at each end of the pallet 12.

The platform 30 includes an elongated support member 46 having a support surface 48 on which the load 14 rests when fully loaded on the pallet 12. The platform 30 also includes a series of ramps 50 separated by steps 52 such that the ramps 50 slope downwardly from the upper face 24 of the pallet base 22 toward the lower face 26. As will be explained below, removable wedges 54 can be placed on the ramps 50 to form a level track for rolling a load on wheels onto the pallet 12. Stacking members 56 extend from each corner of the pallet 12 and nest into corresponding passages (not shown) in the lower face 26 of the pallet for stacking the pallets. Reinforcing members 58 extend longitudinally and laterally across the lower face 26 of the pallet base 22 to strengthen the pallet 12.

Figure 4:
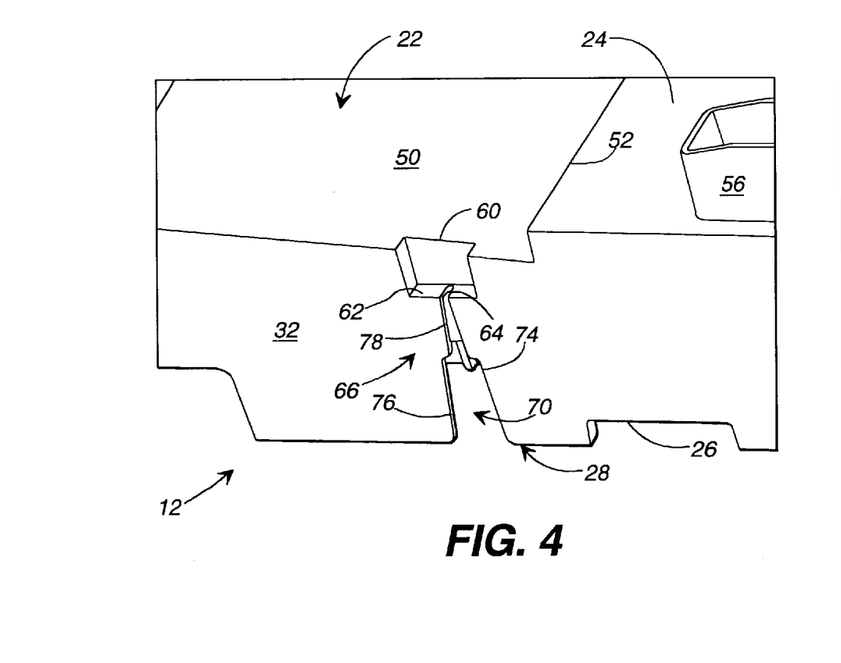
FIG. 4 is a partial perspective view of a clamping mechanism housing in the pallet illustration in FIG. 2.

Each of the housings 28 for the clamping mechanisms 20 are an integral part of the pallet 12 and are positioned along the sides 32 and 34 of the pallet, one proximate each corner of the pallet. As shown in FIG. 4, a recess 60 extends above each housing 28 in the respective one of the sidewalls 32 and 34. Each recess 60 extends from the upper face 24 of the pallet 12, toward the lower face 26, to a rectangular abutment 62. The abutment 62 has an aperture 64 for receiving the strap 18 of the anchoring device 16. The aperture 64 is sized to prevent the clamping mechanism 20 from passing through the aperture when the clamping mechanism is disposed in the housing 28.

Figure 5:
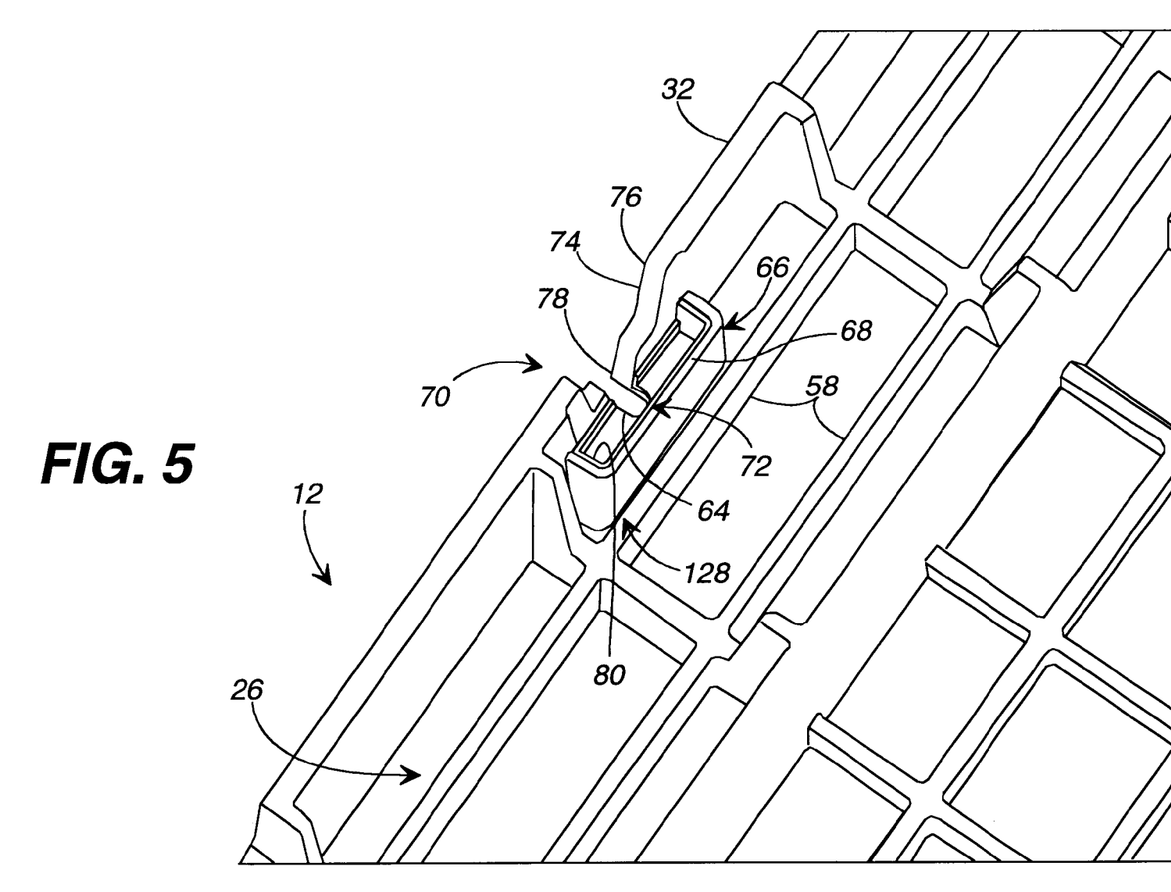
FIG. 5 is a perspective view of the underside of the housing illustrated in FIG. 4.
Figure 6:
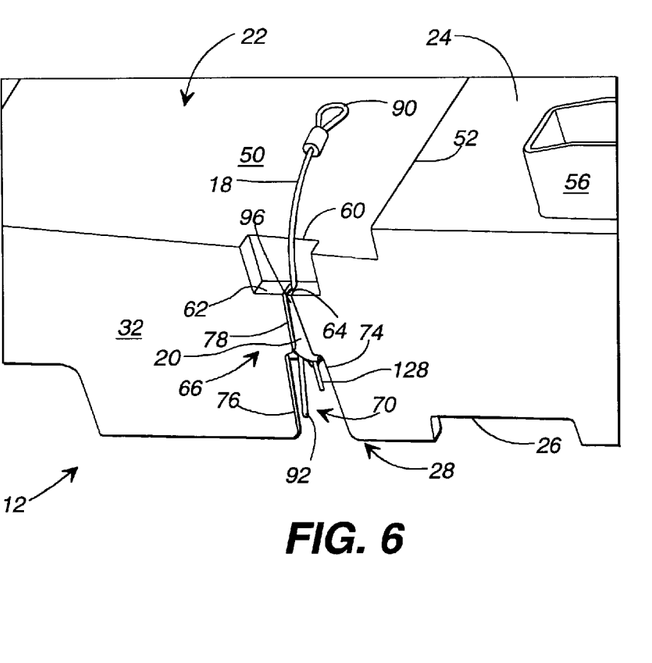
FIG. 6 is a partial perspective view of the housing illustrated in FIG. 4 including an anchoring device with a clamping mechanism disposed in the housing.
Figure 7:
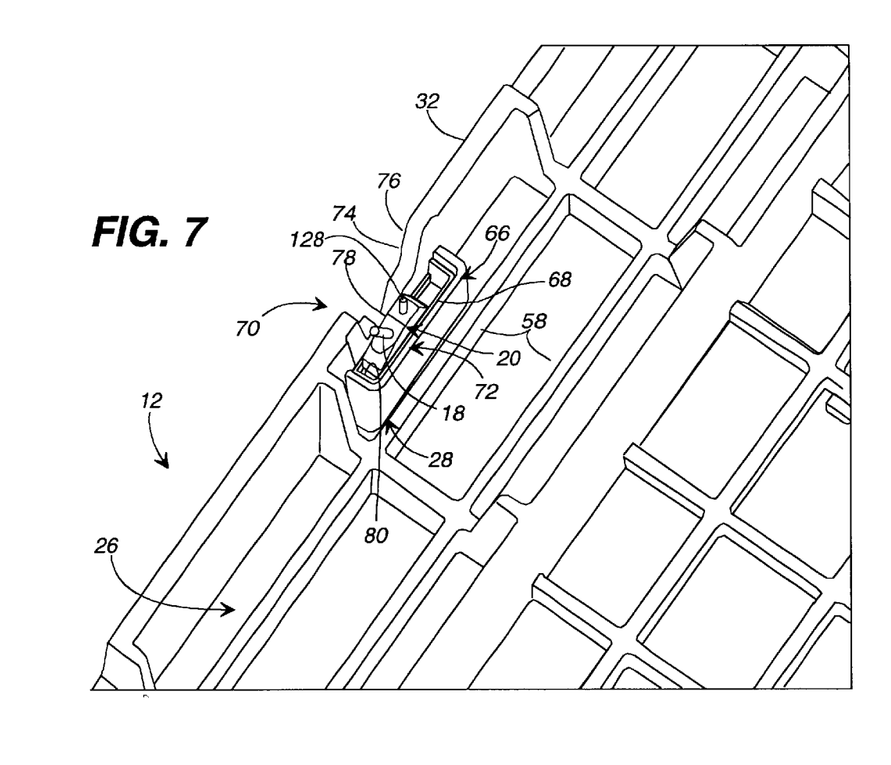
FIG. 7 is a partial perspective view of the underside of the housing illustrated in FIG. 4 with a cl mechanism disposed in the housing.

Each housing 28 also includes an enclosure 66 for surrounding the clamping mechanism 20 when the clamping mechanism is in the housing. The enclosure 66 includes a portion of the adjacent one of the sides walls 32 and 34 and a U-shaped enclosure wall 68 which extends from the abutment 62, downwardly and away from the upper face 24 of the pallet 12 to an opening 70 for receiving the clamping mechanism 20. As illustrated in FIG. 5, the enclosure wall 68 of the housing surrounds the aperture 64 in the abutment 62 and is integrally attached to the abutment and the adjacent one of the sidewalls 32 and 34.

The opening 70 in each housing 28 has a bottom portion 72 which faces downwardly and away from the upper face 24 of the pallet 12 and a side portion 74 which extends upwardly along the adjacent one of the sidewalls 32 and 34. The bottom portion 72 of the opening 70 is sized to receiving the clamping mechanism 20 and the side portion 74 of the opening includes a tapered wider portion 76 which extends from the bottom of the adjacent sidewall 32 or 34 toward the upper face 24 of the pallet 12 to a narrow portion 78 of the opening which also tapers toward the upper face to the aperture 64. The wider portion 76 of the opening 70 is sized to receive the clamping mechanism 20 and a tool, such as a blind rivet gun, for manipulating the clamping mechanism, whereas the narrow portion 78 of the opening is sized to prevent passage of the clamping mechanism so that the clamping mechanism remains securely in the housing 28 even while secured to the load 14 on the pallet.

Desirably, a reinforcing sleeve 80 made of a rigid material such as metal or plastic, is disposed in each housing 28 to protect the housing while the clamping mechanism and anchoring device 16 are securing the load 14 on the pallet 12.

The pallet 12 can be made of a variety of materials provided that the pallet can stand the weight of the load being stored and repeated handling such as with a forklift. Therefore, suitable materials for making the pallet include wood, metal, polymer resins, such as plastic, and the like. Polymer resin is particularly desirable for forming the pallet 12 because many polymer resins are strong, durable, lightweight, and relatively inexpensive. In addition, many polymer resins can be injection molded so that all components of the pallet are integrally connected. A particularly suitable resin is high density polyethylene.

Although the clamping mechanism housings 28 are illustrated in FIGS. 1–7 as being positioned vertically adjacent the sidewalls 32 and 34 below the upper face 24 of the pallet 12, it should be understood that such housings can be molded and installed on any surface of the pallet for the purpose of housing a quick release clamping mechanism 20 for use in conjunction with securing a unit load. In addition, any number of anchoring devices 16 and corresponding housings 28 can be used with a single pallet. Furthermore, the housings 28 can extend laterally, longitudinally, or at any angle with respect to the pallet 12.

The housings 28 should be sized so that the clamping mechanisms 20 fit within the housings and are accessible for manipulation by tools such as a blind rivet gun.

As described above and illustrated in FIGS. 6–8, each anchoring device 16 includes a strap 18 and a clamping mechanism 20 for selectively receiving and clamping to the strap and alternatively releasing the strap. The strap is desirably a wire rope which can be constructed of various materials including aluminum, steel, zinc, nickel, other alloys, polymers, composite materials, and the like. The strap 18 can optionally be coated with plastic, rubber, or other polymer or alloy based material.

Figure 8:
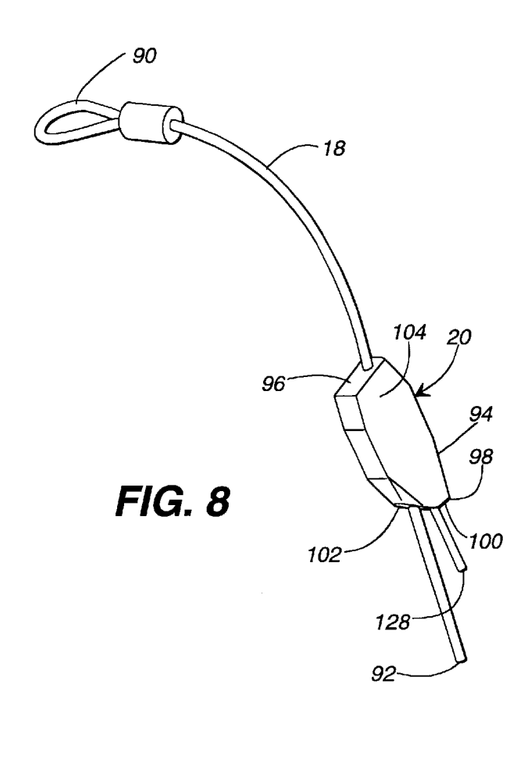
FIG. 8 is a perspective view of the anchoring device illustrated in FIG. 6.

The strap 18 includes an attachment 90 at one end and has a loose end 92 for feeding through the clamping mechanism 20. The attachment 90 shown in FIG. 8 is a wire loop but other suitable attachments include a hook, bolt, slider pin or plate, a u-bolt, and the like. The purpose of the attachment 90 is to attach the strap 18 to the load 14 on the pallet 12 to secure the load to the pallet. Alternatively, the attachment 90 can be attached to one end or side of the pallet while the strap 18 is passed over the load and secured to the other end or side of the pallet with the clamping mechanism 20.

Figure 9:
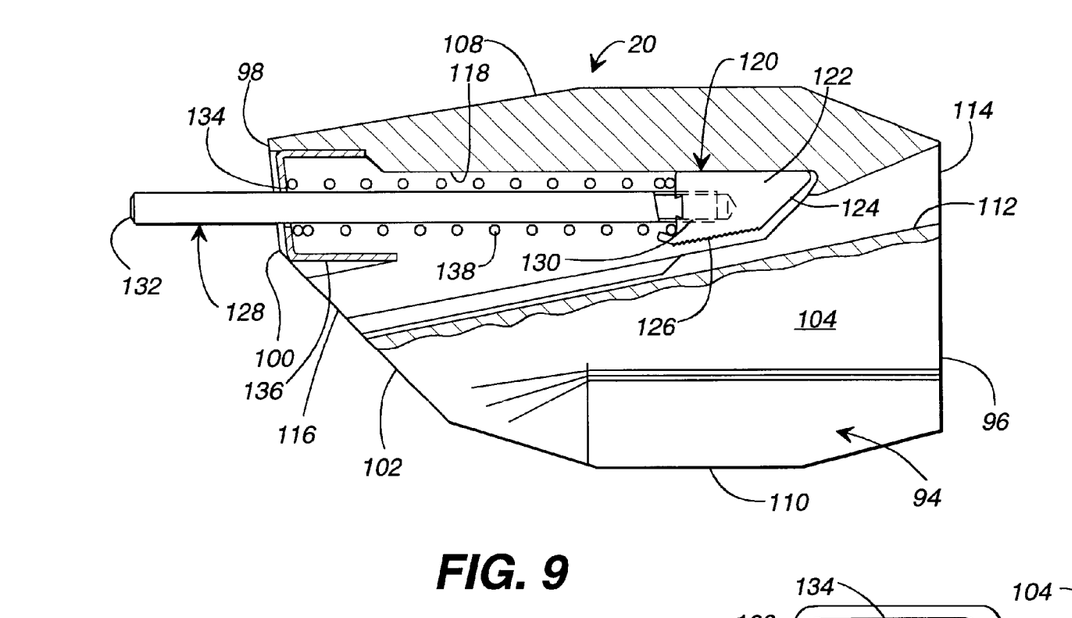
FIG. 9 is a partial sectional plan view of the clamping mechanism illustrated in FIG. 6.
Figure 10:
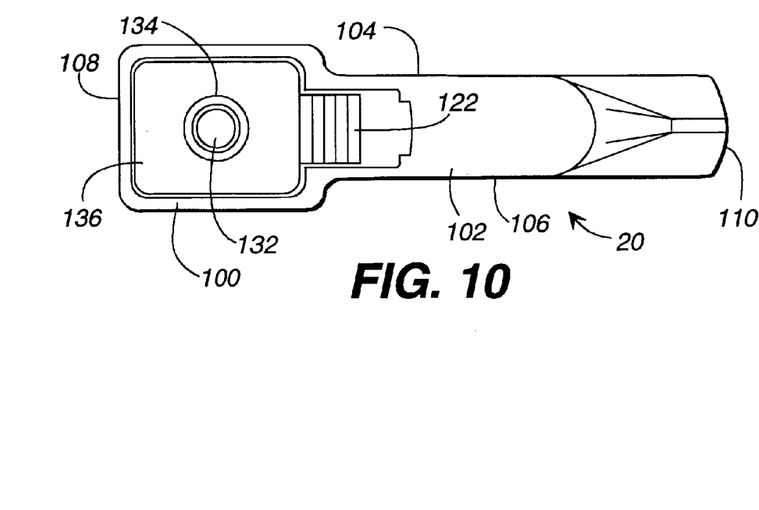
FIG. 10 is an end elevation view of the clamping mechanism illustrated in FIG. 9.

As best illustrated in FIGS. 9 and 10, the clamping mechanism 20 is a reusable, selectively releasable clamping mechanism comprising a body 94 having a generally elongate box-shape with a squared inlet end 96 and an outlet end 98 including a short flat portion 100 and an angled portion 102. The body 94 has two major flat sides 104 and 106 and angled sides 108 and 110 to complete the box shape. A bore 112 extends through the body 94 from an inlet 114 in the inlet end 96 to an outlet 116 in the angled portion 102 of the outlet end 98. The bore 112 receives the loose end 92 of the strap 18. The body 94 also includes a channel 118 converging at an acute angle to the bore 112 from the short flat portion 100 of the outlet end 98 of the body 94 toward the inlet end 96 of the body.

A gripping member 120 is movably disposed in the channel 118 for selectively gripping the strap 18 in the bore 112 to fix the clamping mechanism 20 to the strap, and alternatively, releasing the strap, so that the strap can be released from the bore. The gripping member 120 includes a wedge 122 having an angled tip 124 and a plurality of teeth 126 for engaging and gripping the strap 18. The gripping member 120 also includes a release member 128 which is a rod, having a threaded end 130 threaded into the wedge 122 and an opposite end 132 which extends out of the body 94 along the channel 118. The opposite end 132 of the release member 128 extends through a hole 134 in an abutment 136 tightly fitted into the channel 118 at the outlet end 98 of the body 94. A coil compression spring 138 is disposed in the channel 118 along the release member 128 between the abutment 136 and the wedge 122 to bias the wedge toward the bore 112. The release member 128 can be pulled against the compression spring 138, such as with a blind rivet gun, to pull the wedge 122 away from the bore 122 and the strap 18 in the bore to release the strap. Otherwise, the compression spring 138 biases the wedge 122 toward the bore 112 and into gripping engagement with the strap 18.

The components of the clamping mechanism 20 can be constructed of various materials which suitably include metals such as zinc, steel, aluminum, and other alloys, or plastics or composite materials.

The pallet 12 is particularly suited for holding a load on wheels such as casters. Other configurations of pallets suitable for holding items on casters are illustrated in U.S. Pat. No. 5,787,817 and U.S. patent application Ser. No. 09/075,632, the disclosures of which are expressly incorporated herein by reference in their entirety. The palletizing system of this invention, however, encompasses virtually any type of pallet including conventional pallets with a flat platform.

The clamping member 20 can assume other configurations other than that described above, including those available under the trademark Gripple from Gripple Limited of Sheffield, England. Such devices are disclosed in various patents, including U.S. Pat. No. 5,147,145; U.K. Patent Application 2210517; U.K. Patent Application 2240581; PCT International Application WO95/30844; PCT International Application WO97/36123; U.K. Patent Application 2322435; U.K. Patent Application 23322408; U.K. Patent Application 9814425.6; U.K. Patent Application 9814426.4, and other patents and patent applications, the disclosures of which are expressly incorporated herein by reference in their entirety.

The pallet 12 illustrated in FIG. 1 is loaded with a load 14 on casters by placing the leading end 36 of the pallet adjacent a loading ramp 140 and placing removable wedges 54 at both ends of the first ramps 50 adjacent the leading end of the pallet. The removable wedges allow the front wheels of the load 14, which is a photocopier in FIG. 1, to roll smoothly onto the platform 30 the pallet 12. The removable wedges 54 can then be moved to other ramps 50 as necessary to position the casters of the load 14 for lowering onto the support surface 48 of the elongate support member 46. The load 14 is rolled on its casters down the ramps 50 in the pallet platform 30 until the undercarriage of the load rests firmly on the support surface 48 of the elongate member 46.

The load 14 is then secured to the pallet 12 with the anchoring devices 16. The attachment 90 or loop of each strap 18 is fitted about the wheels of the load 14 to hold the load and the loose end 92 of each strap is fitted through the bore 112 of the respective clamping mechanism 20. The loose end 92 is fed first through the inlet 114 of the bore 112 and then out of the outlet 116 of the bore. The strap 18 moves freely through the bore 112 of the clamping mechanism 20 when the strap is inserted from the inlet 114 toward the outlet 116 of the bore 112. The strap 18 is fed through the aperture 64 in the respective clamping mechanism housing, 28 and the clamping mechanism 20 is fed along the strap 18 until the clamping mechanism fits snuggly in the housing and the strap is taut. The strap 18 is tightened further by pulling the strap through the bore 112 in the clamping mechanism 20. A tool such as a blind rivet gun is useful to pull the strap 18 very taut.

Alternatively, instead of connecting the strap to the load 14 with an attachment 90, a longer strap can be extended over the load 14 and attached to the other side or end of the pallet. Still further, the strap 18 could be extended over the load 14 and anchored at both ends, on opposite sides or ends of the pallet, with a clamping mechanism at each end of the strap.

To release the load 14, the release member 128 of each clamping mechanism 20 is pulled, such as a with a blind riveting gun or other tool, to pull the wedge 122 of the gripping member 120 away from the strap and the bore 112 of the clamping mechanism body 94 so that the strap is released and can be pulled back out the bore of the clamping mechanism through the inlet 114 of the bore. The pallet 12 and anchoring devices 16 can then be reused repeatedly.

It should be understood that the foregoing relates to particular embodiment of the present invention, and that numerous changes may be made therein without departing from the scope of the invention as defined by the following claims.

I claim:

1. A palletizing system for holding a load comprising:
   a pallet comprising a base having an upper face for receiving the load and a lower face; and
   an anchoring device for holding a load on the pallet, the anchoring device comprising a strap for engaging the load and a clamping mechanism for selectively receiving and clamping to the strap so that the load can be secured to the pallet with the anchoring device, and, alternatively, releasing the strap so that the load can be removed from the pallet,
   wherein the pallet further comprises a housing fixed to the base for receiving the clamping mechanism and extending between the upper face and the lower face, the housing having (a) an opening for receiving the clamping mechanism and providing access to the clamping mechanism, so that the clamping mechanism can be manipulated in the housing while the pallet carries the load, (b) an aperture for receiving the strap, the aperture being sized to prevent the clamping mechanism from passing through the aperture, and (c) an abutment including the aperture, the housing extending from the opening to the abutment,
   and wherein the anchoring device is arrangeable such that the strap is capable of being fed through the aperture to engage the load and the clamping mechanism is capable of being disposed in the housing while the clamping mechanism is clamped to the strap for securing the load to the pallet.

2. A palletizing system as in claim 1 wherein the strap comprises a wire.

3. A palletizing system as in claim 1 wherein the strap comprises an attachment at one end for attachment to the load.

4. A palletizing system as in claim 3 wherein the attachment comprises a loop.

5. A palletizing system as in claim 1 wherein the clamping mechanism comprises a body, at least one bore through the body for receiving the strap, and a gripping member movably disposed in the body for selectively gripping the strap in the at least one bore to fix the clamping mechanism to the strap and, alternatively, releasing the strap so that the strap can be released from the at least one bore.

6. A palletizing system as in claim 5 wherein the clamping mechanism body includes a channel in communication with the at least one bore, the gripping member movably disposed in the channel.

7. A palletizing system for holding a load comprising:
   a pallet comprising a base having an upper face for receiving the load and a lower face; and
   an anchoring device for holding a load on the pallet, the anchoring device comprising a strap for engaging the load and a clamping mechanism for selectively receiving and clamping to the strap so that the load can be secured to the pallet with the anchoring device, and, alternatively, releasing the strap so that the load can be removed from the pallet,
   wherein the clamping mechanism comprises a body, at least one bore through the body for receiving the strap, a channel in communication with the at least one bore, and a gripping member movably disposed in the channel of the body for selectively gripping the strap in the at least one bore to fix the clamping mechanism to the strap and, alternatively, releasing the strap so that the strap can be released from the at least one bore, the channel in the body converging at an acute angle to the at least one bore towards an inlet end of the at least one bore and the gripping member movably biased towards the at least one bore, such that, (a) when the gripping member is biased towards the at least one bore, the gripping member forces the strap into frictional engagement with the body within the at least one bore and inhibits withdrawal of the strap through the inlet end of the at least one bore, and (b) when the gripping member is pulled away from the at least one bore, the strap can be released through the inlet of the at least one bore,
   wherein the pallet further comprises a housing fixed to the base for receiving the clamping mechanism and extending between the upper face and the lower face, the housing having (a) an opening for receiving the clamping mechanism and providing access to the clamping mechanism, so that the clamping mechanism can be manipulated in the housing while the pallet carries the load, (b) an aperture for receiving the strap, the aperture being sized to prevent the clamping mechanism from passing through the aperture, and (c) an abutment including the aperture, the housing extending from the opening to the abutment,
   and wherein the anchoring device is arrangeable such that the strap is capable of being fed through the aperture to engage the load and the clamping mechanism is capable of being disposed in the housing while the clamping mechanism is clamped to the strap for securing the load to the pallet.

8. A palletizing system as in claim 7 wherein the gripping member is biased with a spring disposed in the channel.

9. A palletizing system as in claim 8 wherein the gripping member is a wedge.

10. a palletizing system as in claim 5 wherein the at least one bore is a first bore and the body has a second bore for receiving an end of the strap.

11. A palletizing system as in claim 7 wherein the clamping mechanism includes a release member attached to the gripping member and extending away from the at least one bore out of the body for pulling the gripping member away from the at least one bore and releasing the strap.

12. A palletizing system as in claim 3 wherein the attachment comprises a hook.

13. A palletizing system as in claim 1 wherein the housing includes an enclosure extending from the opening to the abutment and surrounding the aperture.

14. A palletizing system as in claim 13 wherein at least a portion of the opening is in the enclosure and extends along the enclosure to the aperture for receiving the strap.

15. A palletizing system as in claim 13 wherein the base includes a sidewall extending between the lower face and the upper face and the housing is positioned adjacent the sidewall.

16. A palletizing system as in claim 15 wherein the housing enclosure includes a portion of the sidewall.

17. A palletizing system as in claim 15 wherein the sidewall has a recess extending from the upper face to the abutment of the housing.

18. A palletizing system as in claim 1 wherein the pallet is made of plastic.

19. A palletizing system as in claim 1 wherein the housing includes a reinforcing sleeve disposed in the housing against the abutment.

20. A palletizing system as in claim 1 wherein the anchoring device is reusable to secure a load to the pallet.

21. A palletizing system for holding a load comprising:
   a pallet comprising a base having an upper face for receiving the load and a lower face; and
   an anchoring device for holding a load on the pallet, the anchoring device comprising a strap for engaging the load and a clamping mechanism for selectively receiving and clamping to the strap so that the load can be secured to the pallet with the anchoring device, and, alternatively, releasing the strap so that the load can be removed from the pallet,
   wherein the pallet further comprises a housing fixed to the base for receiving the clamping mechanism and extending between the upper face and the lower face, the housing having (a) an opening for receiving the clamping mechanism and providing access to the clamping mechanism, so that the clamping mechanism can be manipulated in the housing while the pallet carries the load, (b) an aperture for receiving the strap, the aperture being sized to prevent the clamping mechanism from passing through the aperture, (c) an abutment including the aperture, the housing extending from the opening to the abutment, and (d) an enclosure extending from the opening to the abutment and surrounding the aperture, at least a portion of the opening being in the enclosure and extending along the enclosure to the aperture for receiving the strap, the opening tapering along the enclosure toward the aperture from a wide portion through which the clamping mechanism passes to a narrow portion which prevents passage of the clamping mechanism through the enclosure,
   and wherein the anchoring device is arrangeable such that the strap is capable of being fed through the aperture to engage the load and the clamping mechanism is capable of being disposed in the housing while the clamping mechanism is clamped to the strap for securing the load to the pallet.

22. A palletizing system for holding a load comprising:
   a pallet comprising a base having an upper face for receiving the load and a lower face; and
   an anchoring device for holding a load on the pallet, the anchoring device comprising a strap for engaging the load and a clamping mechanism for selectively receiving and clamping to the strap so that the load can be secured to the pallet with the anchoring device, and, alternatively, releasing the strap so that the load can be removed from the pallet, wherein the pallet further comprises a housing fixed to the base for receiving the clamping mechanism and extending between the upper face and the lower face, the housing having (a) an opening for receiving the clamping mechanism and providing access to the clamping mechanism, so that the clamping mechanism can be manipulated in the housing while the pallet carries the load, (b) an aperture for receiving the strap, the aperture being sized to prevent the clamping mechanism from passing through the aperture, (c) an abutment including the aperture, the housing extending from the opening to the abutment, and (d) an enclosure extending from the opening to the abutment and surrounding the aperture, wherein the base includes a sidewall extending between the lower face and the upper face, the housing is positioned adjacent the sidewall, the housing enclosure includes a portion of the sidewall, and at least a portion of the opening is in the sidewall and the opening tapers inwardly from proximate the lower face to the aperture from a wide portion through which the clamping mechanism passes to a narrow portion which prevents passage of the clamping mechanism through the enclosure, and wherein the anchoring device is arrangeable such that the strap is capable of being fed through the aperture to engage the load and the clamping mechanism is capable of being disposed in the housing while the clamping mechanism is clamped to the strap for securing the load to the pallet.

* * * * *